United States Patent
Shaked et al.

(10) Patent No.: US 7,421,131 B2
(45) Date of Patent: Sep. 2, 2008

(54) SYSTEM AND METHOD FOR BLOCK TRUNCATION-TYPE COMPRESSED DOMAIN IMAGE PROCESSING

(75) Inventors: Doron Shaked, Haifa (IL); Ruth Bergman, Haifa (IL); Gennady Karvitsky, Beit Dagan (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 867 days.

(21) Appl. No.: 10/836,441

(22) Filed: Apr. 29, 2004

(65) Prior Publication Data

US 2005/0244062 A1 Nov. 3, 2005

(51) Int. Cl.
*G06K 9/36* (2006.01)
*G06K 9/46* (2006.01)

(52) U.S. Cl. .................. 382/235; 382/166; 382/254
(58) Field of Classification Search ............. 382/166, 382/232, 235, 243, 254, 299, 300
See application file for complete search history.

(56) References Cited

U.S. PATENT DOCUMENTS 5,585,944 A * 12/1996 Rodriguez .................. 358/500
6,236,405 B1 * 5/2001 Schilling et al. ............ 345/582

* cited by examiner

*Primary Examiner*—Phuoc Tran

(57) ABSTRACT

A method for block truncation-type compressed domain image processing. Image data is received. Block truncation compression (BTC) is performed on the image data to generate a compressed representation of the image data. The broken pixel representation is enhanced in a compressed domain.

38 Claims, 8 Drawing Sheets

200

SYSTEM AND METHOD FOR BLOCK TRUNCATION-TYPE COMPRESSED DOMAIN IMAGE PROCESSING

TECHNICAL FIELD

Embodiments of the present invention relate to the field of image processing.

BACKGROUND ART

Image processing is a process by which input image data can be altered. For example, image processing may be used to change the color space of a digital image. Image processing may be implemented in conjunction with a printing device in order to adjust the color appearance or perceived sharpness of an image according to the specifications of the printing device. Image processing is typically performed on an image processing pipeline over which the image data is transmitted to output hardware, such as a printing device.

Typically, the input hardware determines the input image resolution, and the output hardware determines the output image resolution. At some point over the image processing pipeline, the resolution of the image is changed and the image is processed. In order to generate an output image, it is necessary to determine the resolution in which to perform the image processing.

Image processing may be performed at a number of resolutions: the input resolution, the output resolution, an intermediate resolution, a standard resolution, or any other resolution. When selecting the resolution in which to perform image processing, a number of factors must be considered and weighed. For example, a higher resolution provides better image quality, while a lower resolution provides increased efficiency and less computation time. Furthermore, using a fixed resolution may improve image processing pipeline design. These and other factors describe the trade-offs presented in image processing given input and output resolutions, and other pipeline and human visual constraints.

SUMMARY OF THE INVENTION

Various embodiments of the present invention, a method and system for block truncation-type compressed domain image processing, are described herein. In one embodiment, image data is received. Block truncation compression (BTC) is performed on the image data to generate a compressed representation of the image data. The image is enhanced in a compressed domain.

BRIEF DESCRIPTION OF THE DRAWINGS

The accompanying drawings, which are incorporated in and form a part of this specification, illustrate embodiments of the invention and, together with the description, serve to explain the principles of the invention. The drawings referred to in this description should be understood as not being drawn to scale except if specifically noted.

BEST MODE FOR CARRYING OUT THE INVENTION

Reference will now be made in detail to various embodiments of the invention. While the invention will be described in conjunction with these embodiments, it will be understood that they are not intended to limit the invention to these embodiments. On the contrary, the invention is intended to cover alternatives, modifications and equivalents as defined by the appended claims. Furthermore, in the following detailed description of the present invention, numerous specific details are set forth in order to provide a thorough understanding of the present invention. However, it will be recognized by one skilled in the art that the present invention may be practiced without these specific details. In other instances, well known methods, procedures, components, and circuits have not been described in detail as to avoid unnecessarily obscuring aspects of the present invention.

Aspects of the present invention may be implemented in a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor.

Figure 1:
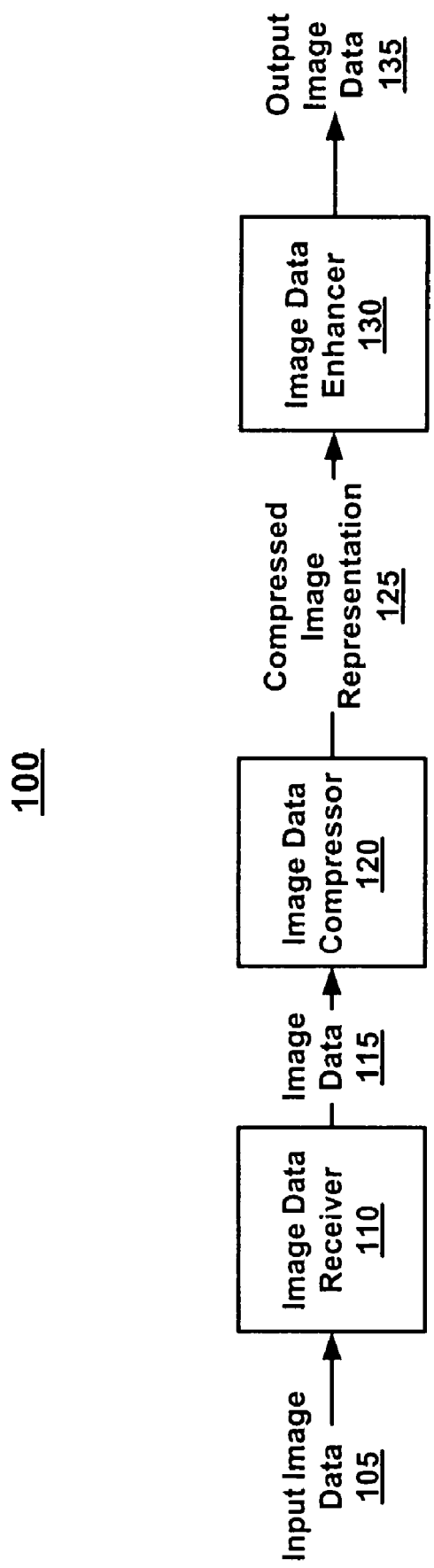
FIG. 1 is a block diagram of a system for block truncation-type compressed domain image processing, in accordance with an embodiment of the present invention.

Method and System for Block Truncation-Type Compressed Domain Image Processing FIG. 1 illustrates a block diagram of system 100 for block truncation-type compressed domain image processing, in accordance with an embodiment of the present invention. System 100 utilizes block-truncation compression to achieve high image quality with a low bit rate. System 100 comprises three modules: image data receiver 110, image data compressor 120, and image data enhancer 130. It should be appreciated that system 100 may be implemented within a computer system as software or as hardware.

System 100 receives input image data 105 at image data receiver 110. In one embodiment, input image data 105 is a Joint Photographic Experts Group (JPEG) image having an arbitrary resolution. For purposes of the present description, input image data 105 is described as a JPEG image; however, it should be appreciated that any form of image data, such as Tagged Image File Format (TIFF), Graphics Interchange Format (GIF), a bitmap, and other forms may be used. Input image data 105 includes luminance information and color information. In one embodiment, the color information includes Red-Green-Blue (RGB) color scheme data. In another embodiment, the color information includes Cyan-Magenta-Yellow-Black (CMYK) color scheme data. Image data receiver 110 may be configured to process input data image 105 prior to transmission to image data compressor 120. Details with respect to particular embodiments of image data receiver 110 are described below at FIGS. 4A and 5.

Embodiments of the present invention pertain to image processing in the compressed domain. Image data 115, which may have been processed at input data receiver 110, is received at image data compressor 120. In one embodiment, image data compressor 120 performs block truncation compression (BTC) on at least a portion of the image data. In one of the embodiments, some blocks (e.g., those with low image variation) may have a single quantization level. The BTC variant used by the present invention provides for compressing a portion of the image data to a low resolution, while maintaining a high resolution on detailed portions. It should be appreciated that the threshold for determining whether a block has one or more quantization levels can be adjusted lower than would be preferable in the compressed output image data 135 in order to preserve more original image details at image data enhancer 130. In one embodiment, BTC is performed on the luminance information of the image data. In another embodiment, BTC is performed on the color image of the image data. In one embodiment, BTC is performed on each plane of the color information (e.g., the red plane, green plane and blue plane for RGB).

BTC operations function to represent a block of N×M pixels by a single quantization value. BTC operations may also break the block into n sub regions, which are represented by a single quantization value each. A block that is broken in n sub regions is referred to as a broken block. In one embodiment, a block of 4×4 pixels is used for BTC operations. A block may be represented as a single value or two values and a binary of the 16 pixels (mapping each pixel to either values).

Figure 2:
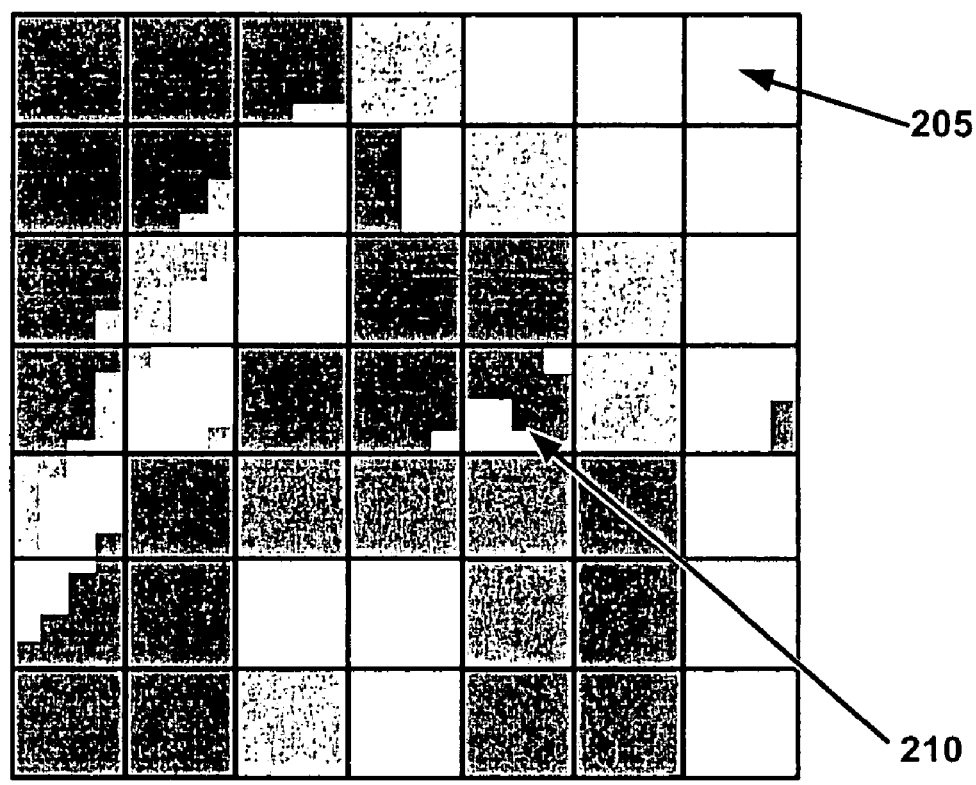
FIG. 2 is a graphical representation of an exemplary block truncation compressed pixel grid including blocks with two quantization levels and blocks with a single quantization level, in accordance with an embodiment of the present invention.

FIG. 2 illustrates a graphical representation of an exemplary BTC pixel grid 200 including some broken blocks, in accordance with an embodiment of the invention. In general, BTC compresses images in such a way that a group of pixels (e.g., a block or a tile) is broken into two parts of a compressed pixel, but, when the two parts differ by less than a predetermined quantization level, the mask can be omitted so that the block is represented as a single value of a compressed pixel which provides for better compression at a small cost in terms of image quality. For example, block 205 of FIG. 2 is unbroken and thus a single value represents the original pixels. Block 210 is a broken block that has been broken into two parts, in which two values are used to represent the original pixels.

With reference to FIG. 1, image data compressor 120 performs BTC on at least a portion of the image data prior to transmitting compressed image representation 125 to image data enhancer 130. Details with respect to particular embodiments of image data compressor 120 are described below at FIGS. 4A and 5. It should be appreciated that BTC is well known in the art, and that any method of BTC may be used in accordance with embodiments of the invention.

Figure 3A:
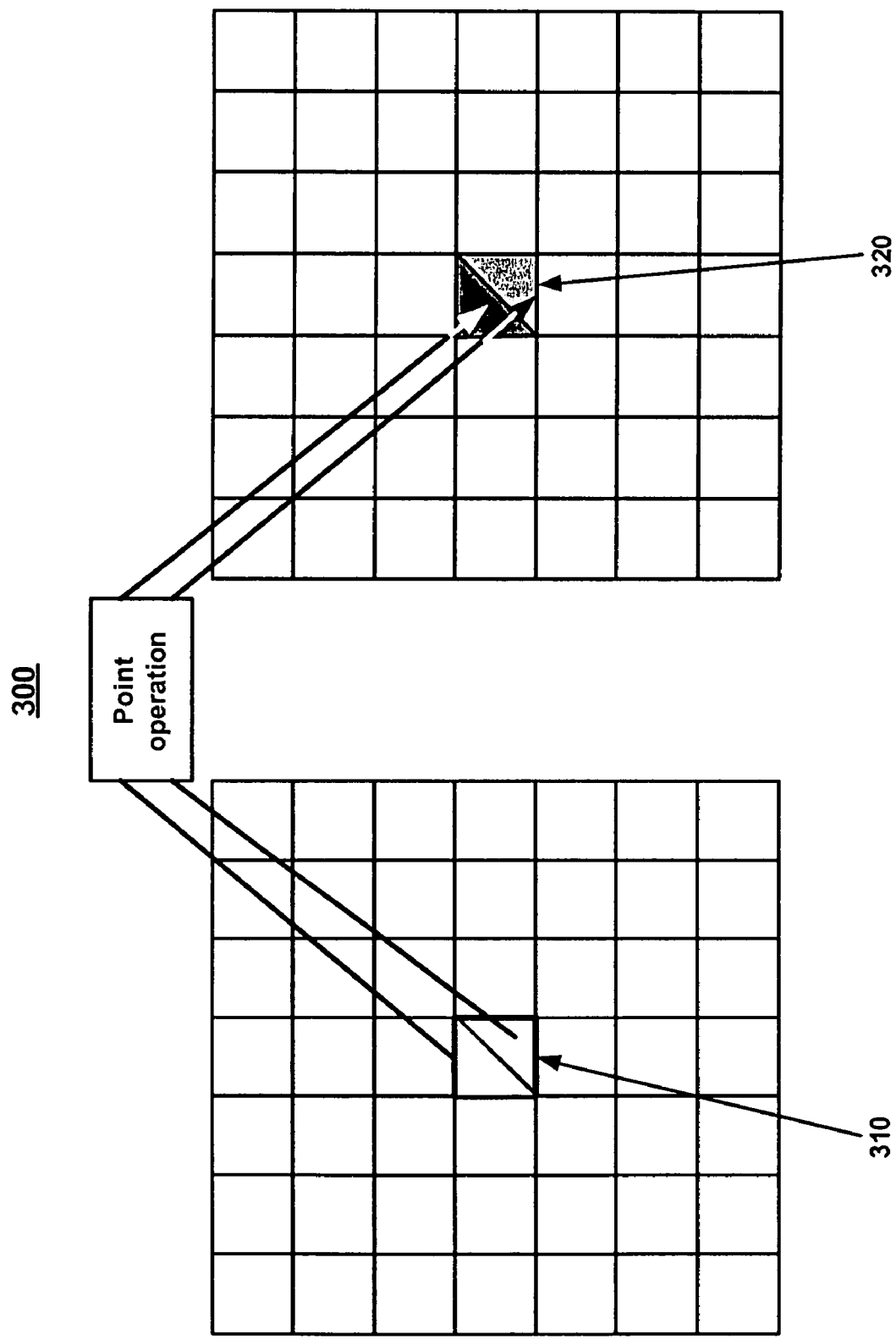
FIG. 3A is a graphical representation of a point image processing operation, in accordance with an embodiment of the present invention.
Figure 3B:
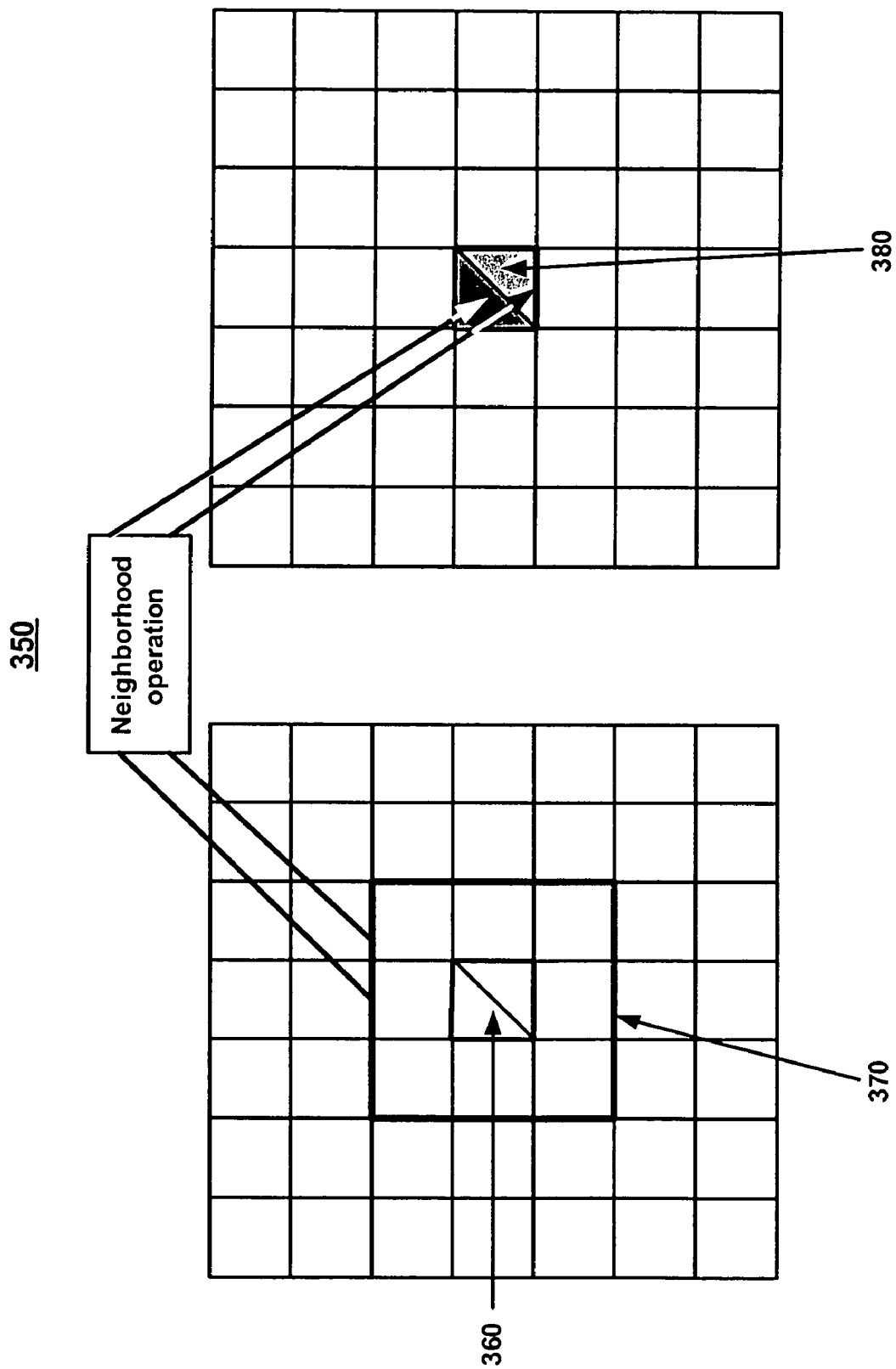
FIG. 3B is a graphical representation of a neighborhood image processing operation, in accordance with an embodiment of the present invention.

Image data enhancer 130 is configured to enhance the broken block representation. In one embodiment, image data enhancer 130 is operable to decompress the compressed image data to a particular resolution. Image data enhancer 130 may also be configured to resample the image data and convert the resampled image data back into the original resolution. In another embodiment, the image enhancement is performed according to an image processing point operation. In another embodiment, the image enhancement is performed according to an image processing neighborhood operation. FIGS. 3A and 3B illustrate graphical representations of a point image processing operation and a neighborhood image processing operation, respectively, in accordance with embodiment of the present invention.

With reference to FIG. 3A, graphical representation 300 shows an image processing point operation. In one embodiment, an image processing point operation is a function that receives input pixel 310 and outputs output pixel 320 that corresponds directly to input pixel 310. In one embodiment, blocks may be processed instead of pixels, and thus input pixel 310 and output pixel 320 may be unbroken blocks. In this embodiment, if input block 310 is broken then output block 320 is broken too. In an image processing point operation, a sub region can be enhanced individually while maintaining sub region partitions.

With reference to FIG. 3B, graphical representation 350 shows an image processing neighborhood operation. In one embodiment, neighborhood operation output image values are a function of pixel values in proximity to a corresponding pixel location in the input image. For example, an image processing neighborhood operation for pixel 360 considers the image values of neighborhood pixels 370 in outputting pixel 380. It should be appreciated that there can be any number of neighborhood pixels 370. For example, an image processing point operation is a special case of an image processing neighborhood operation where the neighborhood pixels 370 includes only one pixel. In one embodiment, pixel 360, neighborhood pixels 370, and pixel 380 are BTC blocks.

In one embodiment, neighborhood blocks are represented by the weighted average of their quantization levels. Output values for each input value of a potentially broken center block, and the influence of one part of a broken center block on the other part is tailored into the neighborhood operation. It should be appreciated that there may be additional considerations depending on the type of BTC used. For example, a BTC may prefer a format specifying average and difference of the quantization values over a format specifying the quantization values separately.

In another embodiment, for linear space-invariant neighborhood operations, the contribution of the neighborhood to the center block is calculated, and then the contribution is added to sub regions that are specified for the center block. For non-linear operations the calculation of the output value will usually have to be repeated for each sub region of the center pixel in the event that the center block is broken.

Figure 4A:
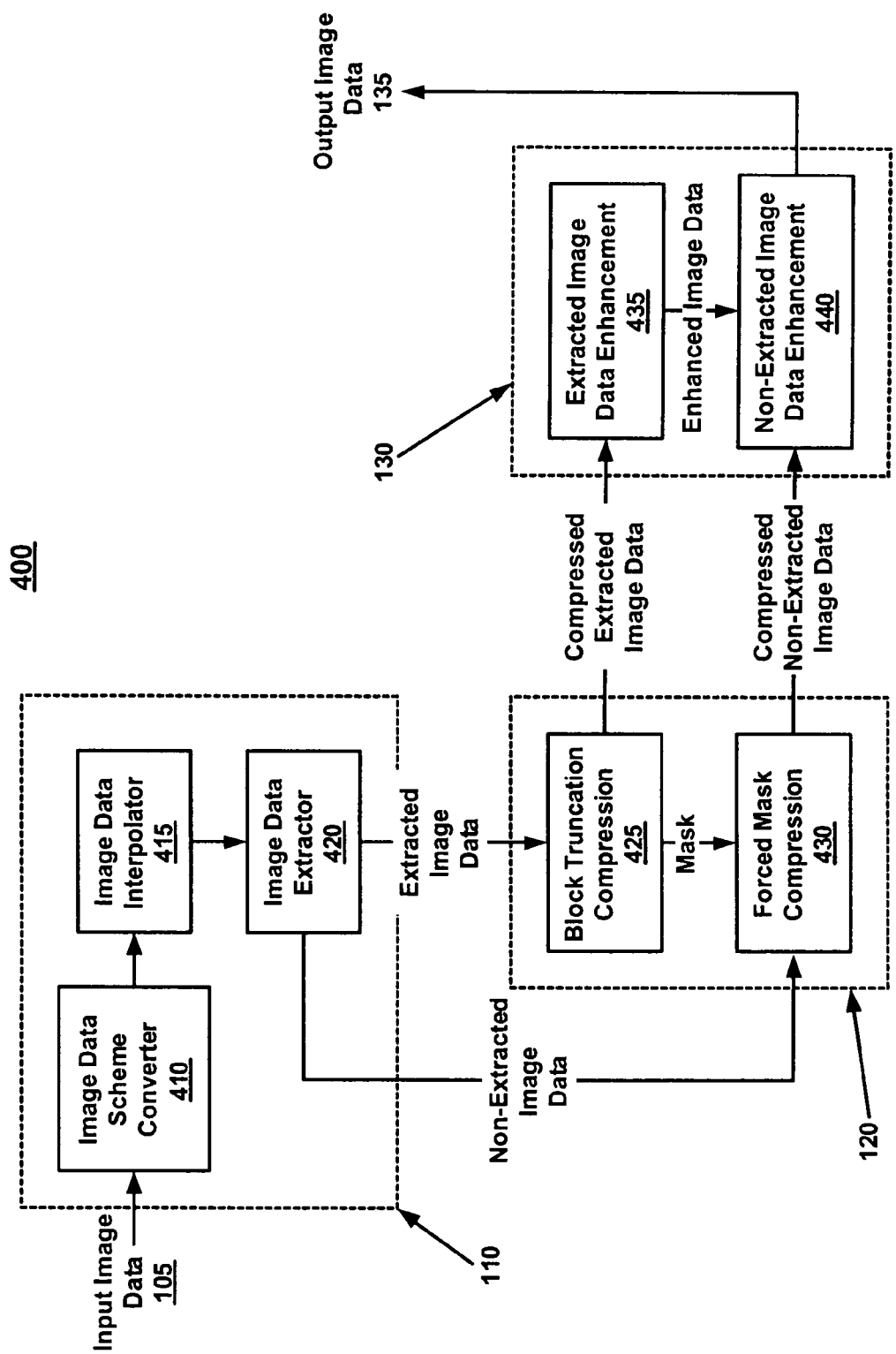
FIG. 4A is a block diagram of a detailed system for block truncation-type compressed domain image processing, in accordance with an embodiment of the present invention.

Details with respect to particular embodiments of image data enhancer 130 are described below at FIGS. 4A and 5. FIG. 4A illustrates a block diagram of a detailed system 400 for block truncation-type compressed domain image processing, in accordance with an embodiment of the present invention. System 400 illustrates one embodiment of system 100 of FIG. 1, and utilizes block-truncation compression to achieve high image quality with a low bit rate. System 400 comprises three modules: image data receiver 110, image data compressor 120, and image data enhancer 130. It should be appreciated that system 400 may be implemented within a computer system as software or as hardware.

Image data receiver 110 receives input image data 105 having an arbitrary resolution. In one embodiment, input image data 105 is a JPEG image. Input image data 105 includes luminance information and color information for describing an image. In one embodiment, the color information includes Red-Green-Blue (RGB) color scheme data. In another embodiment, the color information includes Cyan-Magenta-Yellow-Black (CMYK) color scheme data.

In one embodiment, image data receiver 110 comprises image data scheme converter 410 for converting a color scheme of input image data 105. Different BTC operations are configured for particular color schemes. For example, some BTC operations are configured for image data including a RGB color scheme. In one embodiment, input image data 105 includes a CMYK color scheme. Image data scheme converter 410 is operable to convert the color information from a CMYK color scheme to a RGB color scheme. In one embodiment, the color scheme conversion is performed as an image processing point operation as described at FIG. 3A. It should be appreciated that image data scheme converter 410 may not be necessary since input image data 105 includes color information in the appropriate color scheme. Therefore, image data scheme converter 410 is optional.

In one embodiment, the image data is interpolated to a first resolution. Since different BTC operations are configured for particular resolutions, it may be necessary to interpolate the image data to a particular resolution. Image data interpolator 415 receives the image data, and interpolates the image data to a first resolution. In one embodiment, the first resolution is 320 dots per centimeter (dpcm) (e.g., approximately 812 dots per inch (dpi)). It should be appreciated that image data interpolator 415 may not be necessary if the image data has an appropriate resolution. Therefore, image data interpolator 415 is optional.

In order to improve the performance of a BTC operation, it may be desirable to extract out a portion of the image data for further processing. Image data extractor 420 is operable to extract at least one of the luminance information and the color information from the image data. For purposes of the description, the extracted information is referred to herein as the extracted image data, and the non-extracted information is referred to herein as the non-extracted image data.

The extracted image data and non-extracted image data are transmitted to image data compressor 120. In one embodiment, image data compressor 120 performs a BTC operation on at least a portion of the image data to generate a compressed representation of the image data. BTC unit 425 receives the extracted image data, and performs a BTC operation on the extracted image data, resulting in compressed extracted image data and an edge mask.

In one embodiment, the BTC operation can format the compressed image data as a standard image format. For example, consider where image data 105 is a standard image at 80 dpcm, the image interpolator 415 increases the resolution by a factor of four to 320 dpcm, and the BTC is adapted to process 4×4 pixel blocks. In this case, BTC blocks correspond to original image pixels. In the general case, BTC images can still be represented as low resolution (e.g. 80 dpcm) images. Where a block is broken the specified value (e.g., luminance information or color information) for the corresponding low-resolution pixel is the average value in the block.

In one embodiment, the image data is augmented with three meta-data sets: a dataset specifying a map identifying broken pixels, a dataset specifying the edge mask for the broken pixels, and dataset specifying the difference of the pixel sub regions. In one embodiment, the dataset identifying broken pixels is represented as a binary image. In another embodiment, the dataset identifying broken pixels is represented as a list of coordinates. In one embodiment, the other two datasets are represented as lists. In another embodiment, the other two datasets are represented in an image format.

It should be appreciated that the pixel sub region values can be extracted from the average pixel value difference in pixel sub region values and the edge mask. For example, let $V_0$, $V_1$, and $V_2$ be the average value for the pixel and the values of the two sub regions, respectively. Also let $A_0$, $A_1$, and $A_2$ be the area of the pixel and the area of the two sub regions, respectively. Therefore, $A_0=A_1+A_2$, and $V_0=(A_1*V_1+A_2*V_2)/A_0$. The present embodiment includes the pixel average $V_0$ and the sub-region difference $D=V_1-V_2$, and data about $A_1$, $A_2$ from the edge mask. The sub regions values can be extracted by: $V_1=V_0+A_2*D/A_0$, and $V_2=V_0-A_1*D/A_0$. It should be appreciated that these operations are computationally efficient for $A_0=16$.

In one embodiment, the BTC operation is based on a non-linear enhancement algorithm. In one embodiment, the non-linear enhancement algorithm as shown in Equation 1 is used.

$$Out_i = In_i + \lambda \cdot \sum_{j \in Nb_i} K_{j-i} \cdot \psi(In_i - In_j) \qquad (1)$$

where $In_i$ is the value of the input pixel at the $i^{th}$ location, $Out_i$ is the value of the output pixel at the $i^{th}$ location, $Nb_i$ is the value of the pixel neighborhood at the $i^{th}$ location, $K_{j-i}$ is a kernel value at the j-$i^{th}$ location, $\lambda$ is a constant, and $\psi$ is a non-linear function.

Forced mask compression unit 430 receives the non-extracted image data and the edge mask. In one embodiment, forced mask compression unit 430 imposes the edge mask on the non-extracted image data, generating compressed non-extracted image data. Imposing the edge mask on a non-extracted block is done by computing the two parts of the broken pixel according to the mask obtained for the extracted data. Namely, performing the BTC on the extracted image data, and using the mask obtained for the extracted image data also for the non-extracted image data. The latter amounts to describing both extracted and non-extracted image data as averages of corresponding image data on the corresponding sub-regions of the one edge mask. By performing the BTC on only the extracted image data, and then imposing an edge mask on the non-extracted image data, embodiments of the present invention provide for efficient image compression because the edge mask only needs to be computed once. However, it should be appreciated that in embodiments of the invention BTC unit 425 may perform a BTC operation on all portions of the image data.

In one embodiment, the compressed extracted image data and the compressed non-extracted image data are transmitted to image data enhancer 130. The compressed extracted image data is received at extracted image data enhancement unit 435, which is configured to enhance the received data. In one embodiment, the enhancement is performed according to an image processing point operation. In another embodiment, the enhancement is performed according to an image processing neighborhood operation. Extracted image data enhancement unit 435 generates enhanced image data.

The enhanced image data and the compressed non-extracted image data are received at non-extracted image data enhancement unit 440. In one embodiment, non-extracted image data enhancement unit 440 is configured to combine the enhanced image data with the compressed non-extracted image data. In other words, the enhanced image data is folded back into the compressed non-extracted image data. In one embodiment, the folding back of the enhanced image data into the compressed non-extracted image data is performed according to an image processing point operation.

The folding back of the enhanced image data into the compressed non-extracted image data by non-extracted image data enhancement unit 440 generates output image data 135. In one embodiment, output image data 135 includes the edge mask obtained in BTC module 425.

Figure 4B:
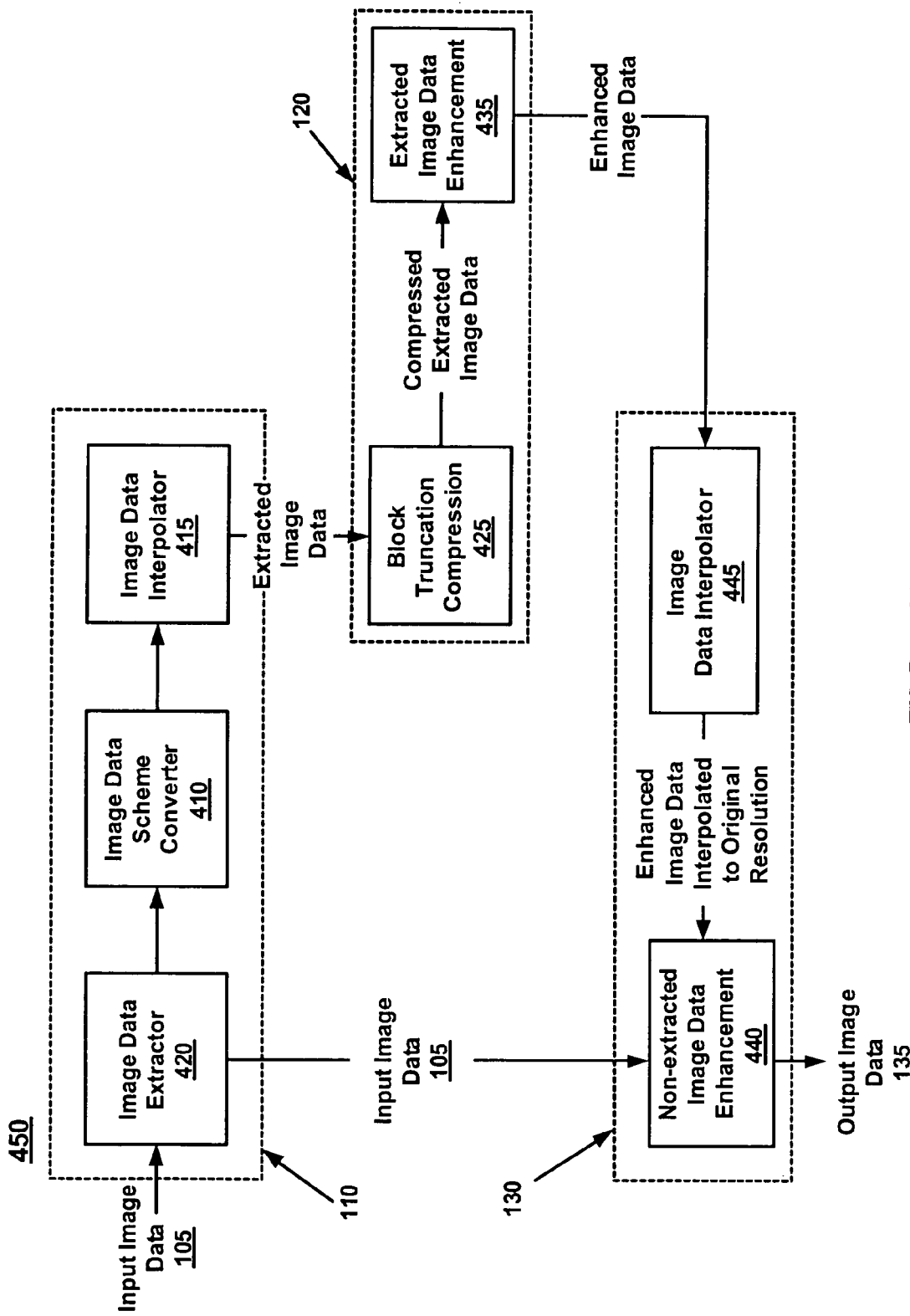
FIG. 4B is a block diagram of a detailed system for block truncation-type compressed domain image processing, in accordance with another embodiment of the present invention.

FIG. 4B illustrates a block diagram of a detailed system 450 for block truncation-type compressed domain image processing, in accordance with another embodiment of the present invention. System 450 includes similar componentry and functionality as system 400 of FIG. 4A. In one embodiment, image quality will be enhanced by the difference between input image data 105 and the interpolation of the enhanced image data back into the original resolution, for example by subtracting part of the difference from the input image data 105.

As shown in FIG. 4B, image data extractor 420 is operable to extract a portion of input image data 105 and to forward input image data 105 to non-extracted image data enhancement unit 440. Furthermore, extracted image data enhancement unit 435 is operable to forward the enhanced image data to image data interpolator 445. Image data interpolator 445 is operable to interpolate the enhanced image data back to the resolution of the input data 105 (thus inverting the interpolation of 415). As described above, image data 105 may be received at an arbitrary resolution. Image data interpolator 445 brings the enhanced data back to the resolution of original image data 105. The enhanced image data interpolated to original resolution is then forwarded to non-extracted image data enhancement unit 440, where it is used to enhance the image. For example, part of the difference between input image data 105 and the interpolated enhanced image data is subtracted from the original image data, where it is output as output image data 135. In one embodiment, the subtraction is performed pixel by pixel in the resolution of the original image data 105.

Figure 5:
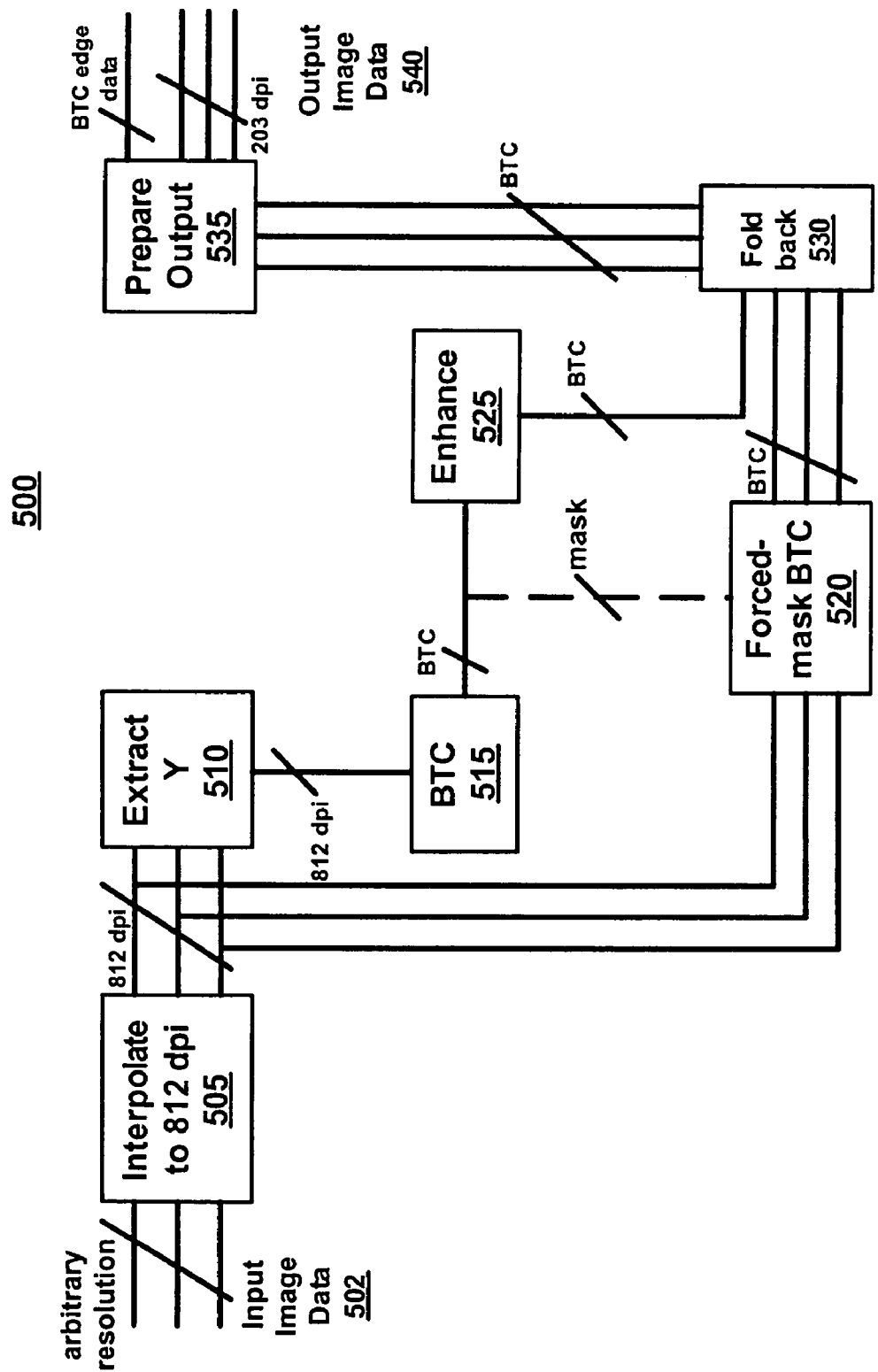
FIG. 5 is a data flow diagram of an exemplary system for block truncation-type compressed domain image processing, in accordance with another embodiment of the present invention.

FIG. 5 illustrates a data flow diagram 500 of an exemplary system for block truncation-type compressed domain image processing, in accordance with another embodiment of the present invention. For purposes of explanation, FIG. 5 is described in conjunction with system 400 of FIG. 4A.

Input image data 502 is received at system 400. Input image data 502 includes RGB scheme color information, as indicated by the three color lines. Input image data 502 is received at an arbitrary resolution. At block 505, input image data 502 is interpolated to a resolution of 812 dpi (320 dpcm). In one embodiment, this interpolation is performed at image data interpolator 415.

At block 510, the luminance information is extracted from the image data. In one embodiment, the extraction is performed at image data extractor 420. The luminance information, having a resolution of 812 dpi, is subjected to a BTC operation at block 515, generating BTC luminance information and an edge mask. In one embodiment, the BTC operation is performed at BTC unit 425.

At block 520, the edge mask is imposed (e.g., forced) onto the color information. Imposing the edge mask onto the color information generates BTC color information. In one embodiment, the edge mask imposition is performed at forced mask compression unit 430.

At block 525, the BTC luminance information is enhanced. In one embodiment, the enhancement is performed according to an image processing point operation. In another embodiment, the enhancement is performed according to an image processing neighborhood operation. In one embodiment, the enhancement is performed at extracted image data enhancement unit 435.

At block 530, the enhanced BTC luminance information is folded back into the BTC color information, generating an enhanced broken pixel representation. In one embodiment, the folding back of the enhanced BTC luminance information into the BTC color information is performed at non-extracted image data enhancement unit 440.

At block 535, output image data 540 is prepared. In one embodiment, output image data 540 includes image data at a resolution of 203 dpi and BTC edge data (e.g., the edge mask). In one embodiment, image quality can be enhanced by interpolating the difference between input image data 502 and output image data 540 back into the original resolution (e.g., as shown in FIG. 4B). In one embodiment, the preparation of output image data 540 may be performed within hardware or software of image data enhancer 130.

Figure 6:
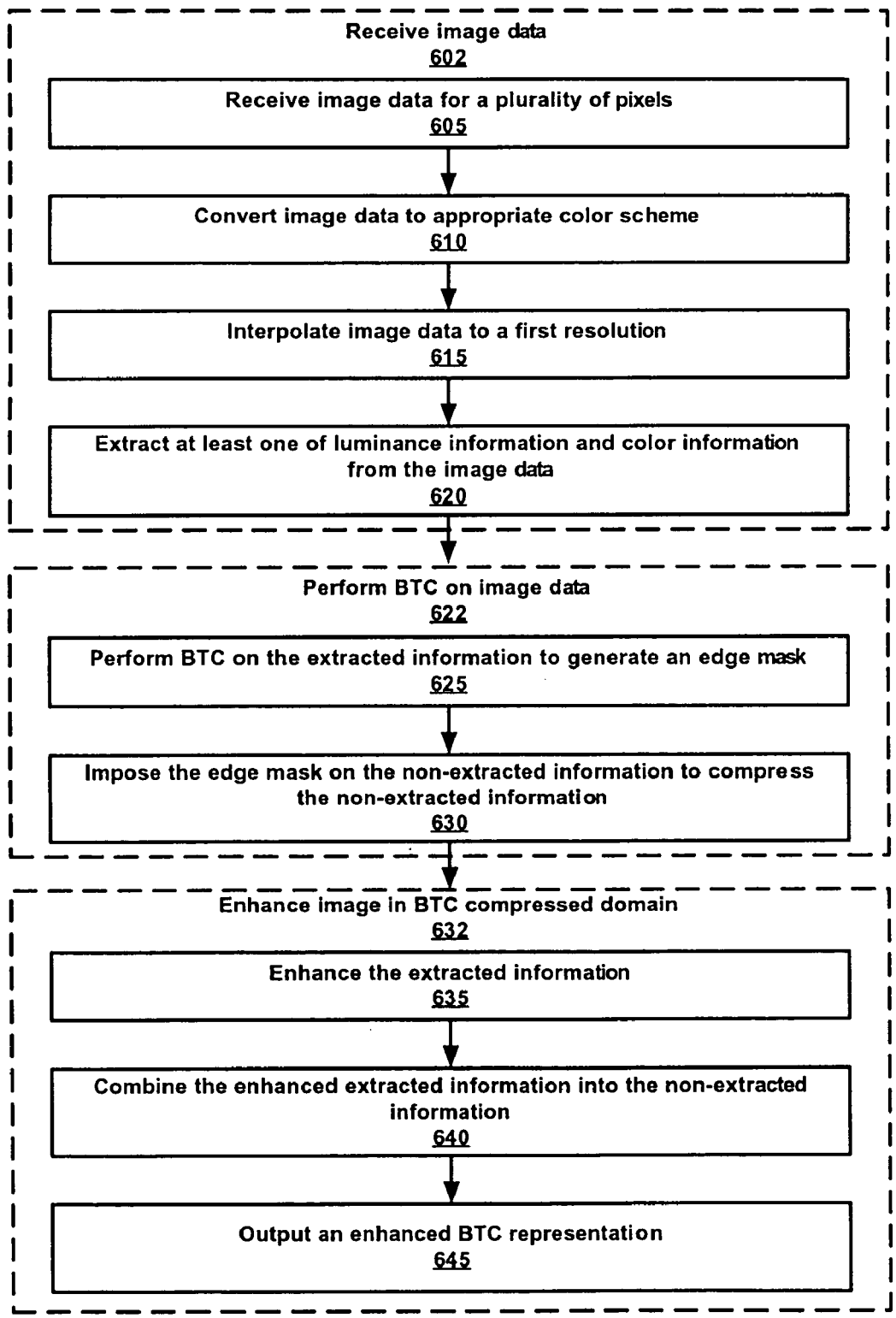
FIG. 6 is a flow chart of a method for block truncation-type compressed domain image processing, in accordance with an embodiment of the present invention.

FIG. 6 illustrates a flow chart of a process 600 for block truncation-type compressed domain image processing, in accordance with an embodiment of the present invention. In one embodiment, process 600 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. Although specific steps are disclosed in process 600, such steps are exemplary. That is, the embodiments of the present invention are well suited to performing various other steps or variations of the steps recited in FIG. 6.

At step 602 of process 600, image data is received. At step 605, image data for a plurality of pixels is received, wherein the image data comprises luminance information and/or color information. The image data is received at an arbitrary resolution. In one embodiment, the image data is represented as JPEG data. In one embodiment, the color information includes RGB color scheme data. In another embodiment, the color information includes CMYK color scheme data.

At step 610, the image data is converted to an appropriate color scheme. For example, if the BTC operation requires RGB image data, and the image data is received as CMYK image data, the image data is converted from the CMYK color scheme to the RGB color scheme. In one embodiment, the conversion is performed according to an image processing point operation. In various embodiments, the image data is received in the appropriate color scheme. Therefore step 610 is optional.

At step 615, the image data is interpolated to a first resolution. It should be appreciated that in embodiments of the invention the image data may be received in the first resolution. Therefore step 615 is optional. At step 620, at least one of the luminance information and the color information is extracted from the image data. It should be appreciated that in embodiments of the invention the extraction may also be optional, (e.g. if the enhancement is done in RGB rather than luminance).

At step 622, a BTC operation is performed on the image data. At step 625, in one embodiment of the invention, a BTC operation is performed on the extracted information of the image data to generate an edge mask and compress the extracted information. At step 630, the edge mask is imposed on the non-extracted information of the image data to compress the non-extracted information. It should be appreciated that step 630 is optional if all data is extracted data.

At step 632, the BTC representation is enhanced in the compressed domain. At step 635, the extracted information is enhanced. In one embodiment, the broken pixel representation is enhanced according to an image processing neighborhood operation. In another embodiment, the broken pixel representation is enhanced according to an image processing point operation. At step 640, the enhanced extracted information is combined into the non-extracted information. It should be appreciated that step 640 is optional if all data is extracted data. At step 645, an enhanced BTC representation of the image data is output in a compressed domain.

Embodiments of the present invention provide a method for processing in the block truncation-type compressed domain. Specifically, embodiments of the present invention provide for optimizing the trade-offs inherent in image processing. For example, the present invention provides a method and system for performing image processing in an efficient manner as if the image was specified in a low resolution for improved data transfer (e.g., bits rates) while providing an image at a high resolution for improved image quality.

Various embodiments of the present invention, a method for block truncation-type compressed domain processing, are thus described. While the present invention has been described in particular embodiments, it should be appreciated that the present invention should not be construed as limited by such embodiments, but rather construed according to the following claims.

What is claimed is:

1. A method for block truncation-type compressed domain image processing, said method comprising:
   receiving image data;
   performing block truncation compression (BTC) on said image data; and
   enhancing said image data in the BTC compressed domain.

2. The method as recited in claim 1 wherein said receiving image data comprises interpolating said image data to a first resolution.

3. The method as recited in claim 1 wherein said receiving image data comprises extracting at least one of luminance information and color information of said image data.

4. The method as recited in claim 1 wherein said performing block truncation compression further comprises:
   extracting at least a portion of said image data to generate extracted information;
   performing block truncation compression on said extracted information of said image data to generate an edge mask; and
   imposing said edge mask on non-extracted information of said image data to compress said non-extracted information.

5. The method as recited in claim 4 wherein said enhancing said image data in the BTC compressed domain comprises:
   enhancing said extracted information;
   combining enhanced extracted information into said non-extracted information; and
   outputting an enhanced BTC representation.

6. A method as recited in claim 1 wherein said enhancing said image data in the BTC compressed domain comprises enhancing a sub region as if it were a pixel in an image.

7. The method as recited in claim 6 wherein said enhancing said sub region is performed according to an image processing neighborhood operation.

8. The method as recited in claim 6 wherein said enhancing said sub region is performed according to an image processing point operation.

9. The method as recited in claim 1 wherein said receiving image data comprises converting said image data to an appropriate color scheme.

10. The method as recited in claim 1 wherein color information for said image data comprises RGB color scheme data.

11. The method as recited in claim 1 wherein color information for said image data comprises CMYK color scheme data.

12. The method as recited in claim 7 wherein a neighborhood block is represented by a weighted average of its sub regions.

13. The method as recited in claim 7 wherein a neighborhood block is represented by an average of its sub regions.

14. The method as recited in claim 7 wherein the contribution of blocks of a neighborhood block is the same for at least two sub regions of a center block of the neighborhood block.

15. A system for performing block truncation-type compressed domain image processing, said system comprising:
   receiving means for receiving image data;
   compression means for performing block truncation compression (BTC) on said image data; and
   enhancement means for enhancing said image data in the BTC compressed domain.

16. The system as recited in claim 15 wherein said receiving means comprises interpolation means for interpolating said image data to a first resolution.

17. The system as recited in claim 15 wherein said receiving means comprises extraction means for extracting at least one of luminance information and color information of said image data.

18. The system as recited in claim 15 wherein said compression means comprises:
   image data extraction means for extracting at least a portion of said image data to generate extracted information;
   block truncation means for performing block truncation compression on said extracted information of said image data to generate an edge mask; and
   edge mask imposition means for imposing said edge mask on non-extracted information of said image data to compress said non-extracted information.

19. The system as recited in claim 18 wherein said enhancement means comprises:
   extracted information enhancement means for enhancing said extracted information;
   combining means for combining enhanced extracted information into said non-extracted information and for outputting an enhanced BTC representation.

20. The system as recited in claim 15 wherein said enhancement means operates according to an image processing neighborhood operation.

21. The system as recited in claim 15 wherein said enhancement means operates according to an image processing point operation.

22. The system as recited in claim 15 wherein said receiving means comprises a conversion means for converting said image data to an appropriate color scheme.

23. The system as recited in claim 17 wherein said color information comprises RGB color scheme data.

24. The system as recited in claim 17 wherein said color information comprises CMYK color scheme data.

25. The system as recited in claim 20 wherein a neighborhood block is represented by a weighted average of quantization value of blocks of said neighborhood block.

26. The system as recited in claim 20 wherein a neighborhood block is represented by a value of a contribution of blocks of said neighborhood block added to at least one sub region of a center block of the neighborhood block.

27. A computer-readable medium having computer-readable program code embodied therein for causing a computer system to perform a method of block truncation-type compressed domain image processing, said method comprising:
   receiving image data;
   performing block truncation compression (BTC) on said image data; and
   enhancing said image data in the BTC compressed domain.

28. The computer-readable medium as recited in claim 27 wherein said receiving image data comprises interpolating said image data to a first resolution.

29. The computer-readable medium as recited in claim 27 wherein said receiving image data comprises extracting luminance information from said image data.

30. The computer-readable medium as recited in claim 29 wherein said performing block truncation compression further comprises:
   performing block truncation compression on said luminance information to generate an edge mask; and
   imposing said edge mask on color information of said image data to compress said color information.

31. The computer-readable medium as recited in claim 30 wherein said enhancing said image data in the BTC compressed domain comprises:
   enhancing said luminance information;
   combining enhanced luminance information into said color information; and
   outputting an enhanced BTC representation.

32. The computer-readable medium as recited in claim 31 wherein said enhancing said luminance information is performed according to an image processing neighborhood operation.

33. The computer-readable medium as recited in claim 31 wherein said enhancing said luminance information is performed according to an image processing point operation.

34. The computer-readable medium as recited in claim 27 wherein said receiving image data comprises converting said image data to an appropriate color scheme.

35. The computer-readable medium as recited in claim 30 wherein said color information comprises RGB color scheme data.

36. The computer-readable medium as recited in claim 30 wherein said color information comprises CMYK color scheme data.

37. The computer-readable medium as recited in claim 32 wherein a neighborhood block is represented by a weighted average of quantization value of blocks of said neighborhood block.

38. The computer-readable medium as recited in claim 32 wherein a neighborhood block is represented by a value of a contribution of blocks of said neighborhood block added to at least one sub region of a center block of the neighborhood block.

* * * * *